United States Patent [19]

Goedken et al.

[11] Patent Number: 5,121,047

[45] Date of Patent: Jun. 9, 1992

[54] BATTERY CHARGING SYSTEM

[75] Inventors: Terrance J. Goedken, Schaumburg, Ill.; James F. Goedken, Dubuque, Iowa

[73] Assignee: Motorola, Inc., Schaumburg, Ill.

[21] Appl. No.: 531,599

[22] Filed: Jun. 1, 1990

[51] Int. Cl.⁵ .............................. H02J 7/04
[52] U.S. Cl. .......................... 320/39; 320/15
[58] Field of Search ...................... 320/15, 39

[56] References Cited

U.S. PATENT DOCUMENTS

| | | | |
|---|---|---|---|
| 3,307,096 | 2/1967 | Lyon | 320/15 |
| 3,848,173 | 11/1974 | Hase | 320/39 |
| 4,649,333 | 3/1987 | Moore | 320/31 |
| 4,692,682 | 9/1987 | Lane et al. | 320/35 |
| 4,695,784 | 9/1987 | Reynolds | 320/39 |
| 4,712,055 | 12/1987 | Houser, Jr. | 320/35 |
| 4,849,682 | 7/1989 | Bauer et al. | 320/15 |
| 5,049,804 | 9/1991 | Hutchings | 320/39 |
| 5,057,762 | 10/1991 | Goedken et al. | 320/15 |

Primary Examiner—William H. Beha, Jr.
Assistant Examiner—Thomas M. Dougherty
Attorney, Agent, or Firm—Robert H. Kelly

[57] ABSTRACT

A system and associated method for fast charging a battery. The current level of a fast charging curent supplied to a battery for the charging thereof is monitored. When the charging current falls below a predetermined level for a certain proportion of a time period, fast charging of the battery is terminated.

20 Claims, 4 Drawing Sheets

BATTERY CHARGING SYSTEM

BACKGROUND OF THE INVENTION

The present invention relates generally to battery charging systems, and, more particularly, to a system and method for fast charging a battery when a fast charging current source is above a minimum current level.

The use of a battery as a power source to power an electrical device is widespread. The battery provides the power necessary to operate the electrical device, and may be positioned proximate to, or housed within, the housing of the electrical device to be carried therewith. Because, when the electrical device is powered by a battery, no fixed connection between the electrical device and a permanent power supply is necessary to permit operation of the device, the electrical device need not be physically positioned proximate to a permanent supply of electrical power to permit operation of the device. Additionally, when the battery is carried along with, or within, the housing of the electrical device, the portability of the electrical device is enhanced.

However, a battery may only store a finite amount of energy to be converted into electrical power. Use of the electrical device discharges the battery, to thereby deplete the battery of remaining stored energy. As a result, after a certain period of use of the electrical device, the battery powering such device must be removed and replaced with a fresh battery.

Rechargeable batteries, e.g., nickel-cadmium type batteries, are widely available. A rechargeable battery, once depleted of stored energy, may be connected to a charging current source, and then recharged. Once recharged, the battery may be connected to power again an electrical device. Such a battery may be recharged up to five hundred, or even more, times, and is advantageous both for reasons of convenience and cost.

Various apparatus is available for recharging a rechargeable battery. Typically, such apparatus includes structure for supporting the rechargeable battery, and a means for electrically connecting the rechargeable battery to a charging current source to be charged therewith. The amount of time required to recharge the rechargeable battery is dependent upon the magnitude of the charging current supplied to the battery (and, additionally, the particular characteristics of the battery being recharged). Some types of battery charging apparatus supply a relatively small current to the battery, and an extended period of time is required in order to recharge the battery. Other types of battery charging apparatus supply a relatively large current to the battery (i.e., fast charge the battery) in order to permit the battery to be recharged in a short period of time. Still other types of battery charging apparatus permit either the relatively small current or the relatively large current to be supplied to the battery.

While, for reasons of convenience, supplying the battery with a relatively high charging current (i.e., fast charging) is advantageous, care must be exercised in order to ensure that the fast charging current source is disconnected from the battery once the batttery has been fully charged to its rated capacity. Overcharging of the battery with the fast charging current can result in damage to the battery, such as, for example, gassing, electrolytic venting of the battery, permanent loss of battery capacity, and physical damage to the battery.

Therefore, many of the known apparatus for charging a battery with the fast charging current include means for terminating fast charging of the battery once the battery is fully charged. For instance, various existing battery chargers include apparatus for implementing the following methods for determining when a battery has been fully charged: coulometric control, time control, pressure sensing, temperature sensing, incremental temperature cutoff, differential temperature cutoff, rate of temperature change, voltage magnitude sense, positive rate of voltage change, inflection point cutoff, voltage decrement cutoff, and negative rate of voltage change. These methods can provide signals responsive to a determination that the battery has been fully charged to terminate fast charging of the battery.

The above-mentioned methods of determining when the battery is fully charged responsive to measurements of battery voltage levels fail to account for battery characteristics of the particular battery undergoing charging. For example, battery characteristics vary according to battery age, battery manufacture, battery type, etc. Hence, a determination that a battery is fully charged responsive to measurements of battery voltage levels is frequently inaccurate.

Additionally, the above-mentioned methods of determining when the battery is fully charged responsive to measurements of battery temperature levels are operative on the premise that, once a battery is fully charged, continued charging of the battery with the fast charging current causes a rapid temperature increase of the battery. However, in some instances, the fast charging current supplied to the battery may be of a level too low to cause a rapid increase in battery temperature even after the battery is fully charged. Battery charging apparatus utilizing these methods, therefore, may not terminate fast charging of the battery, and the fast charging current will be supplied to the battery to continue charging thereof even after the battery is fully charged. As mentioned hereinabove, this continued charging can cause damage to the battery.

U.S. Pat. No. 4,649,333 to Moore, U.S. Pat. No. 4,692,5682 to Lane et al., and U.S. Pat. No. 4,712,055 to Houser, Jr., all disclose battery chargers which terminate fast charging of a battery when the battery temperature levels increase beyond a predetermined value.

Therefore, a battery charging apparatus which provides means for determining when the charging current supplied to the battery is of a level less than a charging current level which causes a rapid battery temperature increase upon full charging thereof is required.

Additionally, certain existing battery charging apparatus permits two or more batteries to be simultaneously charged. However, because the batteries are positioned in parallel to permit charging thereof, the current supplied to any individual battery is only a fraction of the total current supplied to the charging apparatus. The amount of current supplied to any particular battery is therefore dependent upon the number of batteries being charged simultaneously.

Typically, the battery charging apparatus is supplied current from a permanent power supply through appropriate coupling to a transformer interconnecting the power supply and the battery charging apparatus. Therefore, the amount of current supplied to a battery positioned in parallel with one or more other batteries is dependent not only upon the total number of batteries positioned to be charged simultaneously, but, additionally, upon the size of the transformer to which the charging apparatus is coupled to receive the current.

The current supplied to battery charging apparatus which may be adequate to fast charge a certain number of batteries may not be adequate to fast charge an increased number of batteries without causing the fast charge termination problems noted hereinabove. While the battery charging apparatus may be designed to permit fast charging of only a predefined number of batteries with current supplied through a transformer of a particular size, such charging apparatus would be of limited versatility.

What is needed, therefore, is battery charging apparatus which can determine the amount of current supplied thereto, and responsive to such determination, permit fast charging of only the number of batteries which may be suitably fast charged.

Summary of the Invention

It is accordingly an object of the present invention to provide a battery charging system for fast charging a battery, and associated method therefor, which provides an indication of when the charging current supplied to the battery is less than a predetermined level.

It is a further object of the present invention to provide a battery charging system for fast charging a battery which terminates fast charging of the battery after a predetermined period of time when the charging current supplied to the battery is less than the predetermined level.

It is a yet further object of the present invention to provide a battery charging system for charging two or more batteries responsive to a determination of the amount of current supplied thereto.

In accordance with the present invention, therefore, a battery charging system, and an associated method therefor, for fast charging at least one battery with a fast charging current is disclosed. The battery charging system determines when a fast charging current supplied to the battery is beyond allowable limits. When the charging current supplied to the battery is determined to be beyond the allowable limits, the battery is disconnected from the supply of charging current after a predetermined period of time.

Brief Description of the Drawings

The present invention will be better understood when read in light of the accompanying drawings in which.

DESCRIPTION OF THE PREFERRED EMBODIMENTS

Figure 1:
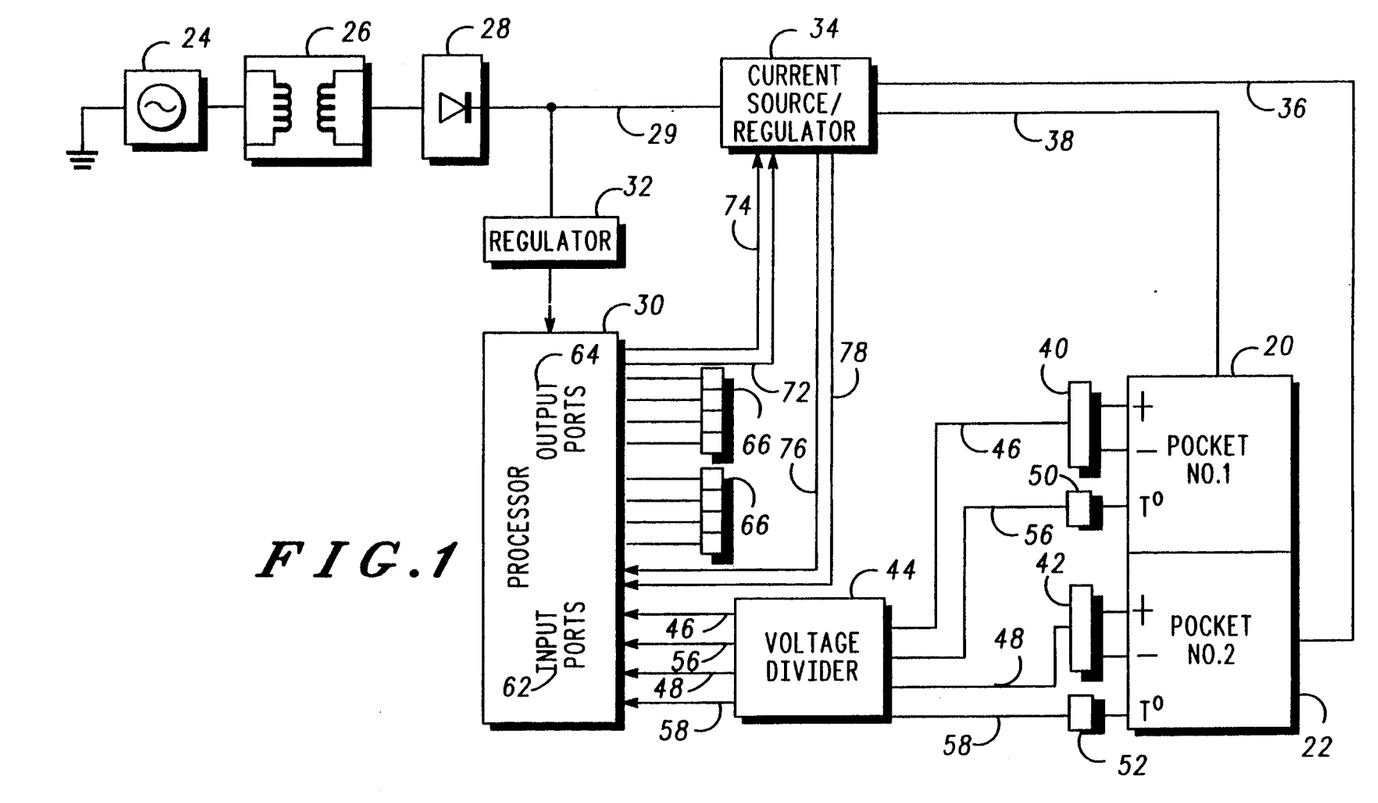
FIG. 1 is a block diagram of a preferred embodiment of the battery charging system of the present invention.

Turning first to FIG. 1, there is shown, in block form, the battery charging system of the preferred embodiment of the battery charging system of the present invention in which two batteries may be simultaneously charged with a charging current. It is to be noted at the outset, however, that the system of the present invention may be utilized to charge greater or fewer (namely, one) numbers of batteries. A first battery may be positioned in first battery charging pocket 20, and a second battery may be positioned in second battery charging pocket 22. Pockets 20 and 22 are electrically connected, as will be described hereinbelow, to receive current generated by supply 24 of charging current. Charging current supply 24 may, for example, comprise a permanent, AC power supply, such as, e.g., the current supplied to a conventional, household electrical outlet.

Primary side of transformer 26 is connected to the charging current supply 24 by conventional means, such as, for example, by pronged connectors to the conventional, household electrical outlet. Secondary side of transformer 26 is coupled to rectifying circuit 28. Rectifying circuit 28 rectifies the current supplied thereto by the secondary side of transformer 26 and outputs a rectified current on line 29. The current rectified by rectifying circuit 28 is supplied to processor 30 through current regulator 32. Current regulator 32 provides a regulated current to processor 30, such as, for example, a five volt regulated supply. The rectified current output on line 29 is additionally supplied to current source/regulator 34. Current source/regulator 34 supplies a regulated current on lines 36 and 38 to battery charging pockets 20 and 22, respectively, to thereby supply the regulated current to batteries suitably positioned in the respective pockets 20 and/or 22.

Voltage measuring means 40 measures voltage levels across opposite terminals of a battery positioned in first battery charging pocket 20 and voltage measuring means 42 measures voltage levels across opposing terminals of a battery positioned in second battery charging pocket 22. Signals indicative of the values of the voltage levels measured by the respective voltage measuring means 40 and 42 are supplied to voltage divider 44 on lines 46 and 48, respectively.

Temperature measuring means 50 measures the temperature level of a battery positioned in first battery charging pocket 20, and temperature measuring means 52 measures the temperature of a battery positioned in second battery charging pocket 22. Signals indicative of the temperatures measured by temperature measuring means 50 and 52 are supplied to voltage divider 44 on lines 56 and 58, respectively.

Voltage divider 44 divides the values of the signals provided thereto on lines 46–58, and outputs signals on lines 46'–58' of values suitable for input to input ports 62 of processor 30. Processor 30 further includes output ports 64 which may be coupled to output devices such as light emitting diodes 66.

Lines 72 and 74 connecting microprocessor 30 (at output port 64 thereof) and current source/regulator 34 permit control signals (to be referred to hereinbelow as charge enable signals) to be supplied to current source/regulator 34. As will be described more fully hereinbelow, values of the charge enable signals supplied on lines 72 and 74 are determinative of when current source/regulator 34 supplies fast charging current on lines 36 and 38, respectively.

Lines 76 and 78 connecting processor 30 (at input port 62 thereof) and current source/regulator 34 permit status signals (to be referred to hereinbelow as current regulation status signals) indicative of the level of the rectified current supplied to regulator 34 to be input to processor 30. As will also be described more fully hereinbelow, values of the current regulation status signals supplied on lines 76 and 78 are determinative of when processor 30 generates the charge enable signals on lines 72 and 74.

Figure 2:
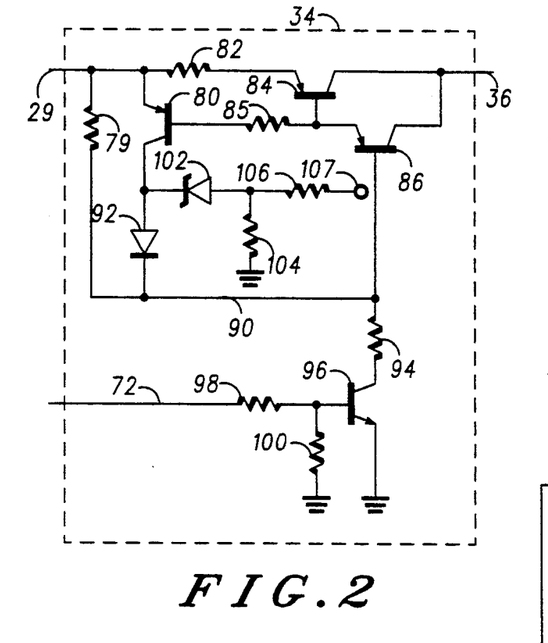
FIG. 2 is a circuit diagram of a circuit comprising a portion of the battery charging system of FIG. 1.

FIG. 2 is a circuit diagram of a portion of the current source/regulator 34 shown in block form in FIG. 1. The rectified signal generated by rectifying circuit 28 is supplied to current source/regulator 34 on line 29. Line 29 is coupled to a first side of shunt resistor 79, directly to the emitter leg of transistor 80, and across resistor 82 to the base leg of transistor 80 and the emitter leg of transistor 84. Resistor 85 is connected between the base legs of transistors 80 and 84. Collector legs of transistors 84 and 86 are connected theretogether and form a node which is electrically coupled to output line 36 connecting regulator 34 and first battery charging pocket 20.

A second side of shunt resistor 79 is connected at node 90 with the base leg of transistor 86. The collector leg of transistor 80 is also connected to node 90 across diode 92. Resistor 94 is connected at a first side thereof to node 90 and at a second side thereof to collector leg of transistor 96. The emitter leg of transistor 96 is coupled to ground, thereby creating a path to ground when transistor 96 is turned on. Line 72 is coupled to the base leg of transistor 96 across resistor 98. The base leg of transistor 96 is also connected to ground across shunt resistor 100.

Normally, a signal (the charge enable signal) is supplied on line 72 to turn on transistor 96. A path to ground through resistor 94 is created, thereby connecting node 90 to ground across the resistor 94. The voltage at node 90, at a known potential above ground (determined by the value of resistor 94), biases transistors 84 and 86. When transistors 84 and 86 are biased, a circuit path is created between line 29 and line 36. However, by proper selection of the value of resistor 82, the voltage drop caused thereacross between the emitter and base legs of transistor 80 turns transistor 80 on, thereby providing a path to node 90 through diode 92, and thereby starting to turn off transistors 84 and 86. An equilibrium is thereby established whereby the current through resistor 82 is held constant at the turn-on point of transistor 80.

In this manner, during normal operation, current regulation is achieved and a regulated current is supplied to line 36 to fast charge a battery positioned in first charging pocket 20. The Motorola SLN 4251A travel charger includes the charge current regulation circuitry above-described.

However, when the current supplied on line 29 is not great enough to cause a voltage drop across resistor 82 to turn transistor 80 on, transistors 84 and 86 are always on, providing current to line 36 to fast charge a battery positioned in first charging pocket 20. As mentioned previously, a battery can be damaged if the battery is supplied with a fast charging current after the battery has been fully charged. Additionally, a low, fast charging current, such as a fast charging current level which does not cause a great enough voltage drop across resistor 82 to turn on transistor 80, may not cause a battery temperature rise great enough to permit a determination to be made that the battery is fully charged. In such a situation, fast charging is not terminated, and the battery can be damaged.

Of significance, therefore, the present invention provides a means for determining when the current supplied to current source/regulator 34 is great enough to cause a voltage drop across resistor 82 to turn transistor 80 on. Transistor 80 and resistor 82 are selected to have characteristics that, when connected as shown in the Figure, a current supplied on line 29 great enough to turn on the transistor 80, also is great enough to cause a battery temperature rise once the battery is fully charged when the current is supplied on line 36 to the battery positioned in charging pocket 20.

The circuit of FIG. 2 further includes zener diode 102, having a positive side thereof connected to the collector leg of transistor 80, and a negative side thereof connected to resistors 104 and 106. Only when transistor 80 is turned on is current supplied to resistor 106.

The current at resistor 106 may be utilized to form the current regulation status signal mentioned briefly hereinabove as an input to processor 30. The current regulation status signal is generated only when transistor 80 is turned on. Only when this signal is generated should the battery be permitted to be fast charged with the fast charging current. By connecting terminal 107 to line 76 (shown in FIG. 1), the current regulation status signal may be supplied to processor 30.

Appropriate adjustment of the control algorithm embodied within processor 30 prevents charging problems due to transient variance of the rectified current supplied to current source/regulator 34. Transient variance of the current, if of a significant magnitude, can cause cycling on and off of transistor 80, and, hence, can cause similar cycling of the current regulation status signal. By adjusting the control algorithm to ensure that the current regulation status signal is or is not generated for at least a portion of a time period (such as a period defined by the frequency of the charging current supply 24), permitting or terminating fast charging of a battery responsive merely to transient variances is avoided.

Figure 3:
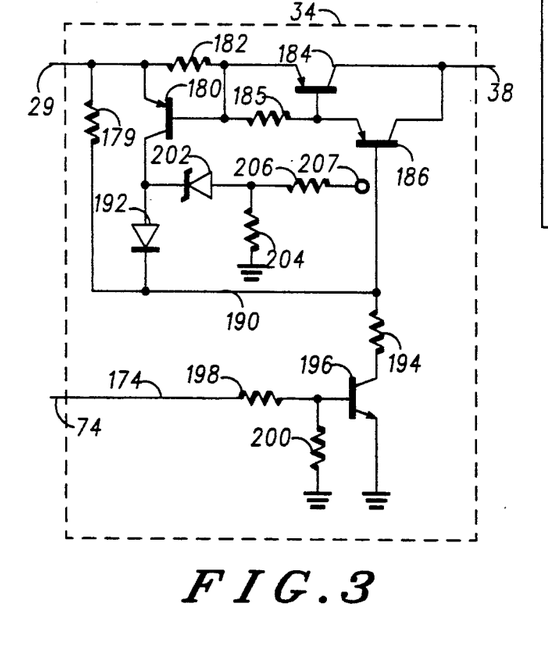
FIG. 3 is a circuit diagram, similar to that of FIG. 2, of a circuit comprising a portion of the battery charging system of FIG. 1.

FIG. 3 is a circuit diagram of a second portion of the current source/regulator 34 shown in block form in FIG. 1. The circuit of FIG. 3 is similar to that shown in FIG. 2, and differs only in that the circuit is utilized to provide a fast charging current on line 38 to second battery charging pocket 22. The circuit of FIG. 3 is positioned in parallel with the circuit of FIG. 2 to receive the rectified current generated by rectifying circuit 28 on line 29.

The rectified signal generated by rectifying circuit 28 is supplied to current source/regulator 34 on line 29. Line 29 is coupled to a first side of shunt resistor 179 directly to the emitter leg of transistor 180 and across resistor 182 to the base leg of transistor 180 and the emitter leg of transistor 184. Resistor 185 connects a side of resistor 182 to the base leg of transistor 184 and the emitter leg of transistor 186. Collector legs of transistors 184 and 186 are connected theretogether and form a node which is electrically coupled to output line 38 connecting regulator 34 and second battery charging pocket 22.

A second side of shunt resistor 179 is connected at node 190 with the base leg of transistor 186. The collector leg of transistor 180 is also connected to node 190 across diode 192. Resistor 194 is connected at a first side thereof to node 190 and at a second side thereof to collector leg of transistor 196. The emitter leg of transistor 196 is coupled to ground, thereby creating a path to ground when transistor 196 is turned on. Line 174 is coupled to the base leg of transistor 196 across resistor 198. Shunt resistor 200 also connects the base leg of transistor 196 to ground.

Normally, a signal (the charge enable signal) is supplied on line 74 to turn on transistor 196. A path to ground through resistor 194 is created, thereby connecting node 190 to ground across the resistor 194. The voltage at node 190, at a known potential above ground (determined by the value of resistor 194), biases transistors 184 and 186. When transistors 184 and 186 are biased, a circuit path is created between line 29 and line 38. However, by proper selection of the value of resistor 182, the voltage drop caused thereacross between the emitter and base legs of transistor 180 turns transistor 180 on, thereby providing a path to node 190 through diode 192, and thereby starting to turn off transistors 184 and 185. An equilibrium is thereby established whereby the current through resistor 182 is held constant at the turn-on point of transistor 180.

In this manner, during normal operation a regulated current is supplied to line 38 to fast charge a battery positioned in second charging pocket 22.

However, when the current supplied on line 29 is not great enough to cause a voltage drop across resistor 182 to turn transistor 180 on, transistors 184 and 186 are always on, providing current to line 38 to fast charge a battery positioned in second charging pocket 22. As mentioned previously, a battery can be damaged if the battery is supplied a fast charging current after the battery has been fully charged. Additionally, a low, fast charging current, such as a fast charging current level which does not cause a great enough voltage drop across resistor 182 to turn on transistor 180, may not cause a battery temperature rise great enough to permit a determination to be made that the battery is fully charged. In such a situation, fast charging is not terminated, and the battery can be damaged.

Similar to the circuit of FIG. 2, the circuit of FIG. 3 further includes zener diode 202, having a positive side thereof connected to the collector leg of transistor 180, and a negative side thereof connected to resistors 204 and 206. Only when transistor 180 is turned on is current supplied to resistor 206.

The current at resistor 206 may, similar to the current at resistor 106 of FIG. 2, be utilized to form a current regulation status signal. The current regulation status signal is generated only when transistor 180 is turned on. Only when this signal is generated should the battery positioned in second charging pocket 22 be permitted to be fast charged with the fast charging current. Connecting terminal 207 to line 78 permits the current regulation status signal to be supplied to processor 30. The control algorithm of processor 30 may similarly be appropriately adjusted in order to prevent charging problems due to transient variance of the rectified current supplied to current source/regulator 34.

Additional battery charging pockets may similarly be added to permit fast charging of greater numbers of batteries. Current source/regulator 34 need only provide additional circuitry similar to the circuits illustrated in FIGS. 2 and 3 to provide current regulation status signals when the charging current supplied on line 29 is above a predetermined minimum level. It is to be noted that resistors 82 and 182 may be of different values. Transistors 80 and 180 thereby turn on (or turn off) to permit (or terminate) fast charging of batteries positioned in the respective battery charging pockets at different minimum charging rates.

In a further embodiment of the present invention, the processor 30 determines how many batteries may be charged simultaneously, and only permits that number of batteries to be charged even though a greater number of batteries may be positioned in charging pockets to permit charging thereof. Because the magnitude of regulated current supplied on line 29 to current/source regulator 34 does not vary, and because batteries are positioned in parallel to permit charging thereof, each additional battery reduces the charging current which may be supplied to each battery. The processor may initiate a test algorithm to ensure that a current status regulation signal is generated for each battery charging pocket prior to fast charging of the batteries. If the current supplied on line 29 is not sufficient to fast charge all of the batteries simultaneously, one of the batteries is deleted from the charging circuit by appropriate switching circuitry. The algorithm is repeated, and batteries are deleted from the charging circuit until all of the batteries remaining in the charging circuit may be simultaneously charged with an adequate fast charging current.

Positioning of a battery positioned in first battery charging pocket 20 permits the battery to receive a fast charging current on line 36. However, current source/regulator 34 only outputs a fast charging current on line 36 when a signal is supplied by processor 30 on line 72 to bias the base of transistor 92. Processor 30 outputs a charge enable signal on line 72 only when a current is detected through resistor 104. As noted hereinabove, transistor 80 turns on only when a suitable biasing voltage is applied to the base leg thereof. Because the biasing voltage of the base of transistor 80 is controlled by the voltage drop across resistor 82, appropriate selection of the value of resistor 82 causes transistor 80 to turn on only when the charging current supplied on line 29 is greater than a certain level. Therefore, the existence of a current through transistor 104 is indicative of a charging current on line 29 which is in excess of a predetermined value. By connecting an end of resistor 104 to processor 30 through line 76, processor 30 is provided with an input indicative of those times in which a charging current supplied on line 29 is above a threshold level. When the current regulation status signal is generated, processor 30 outputs a signal on line 72 to permit continued fast charging of a battery positioned in first battery charging pocket 20. Positioning of a battery in second battery charging pocket 22 permits charging thereof in an analogous manner.

Figure 4:
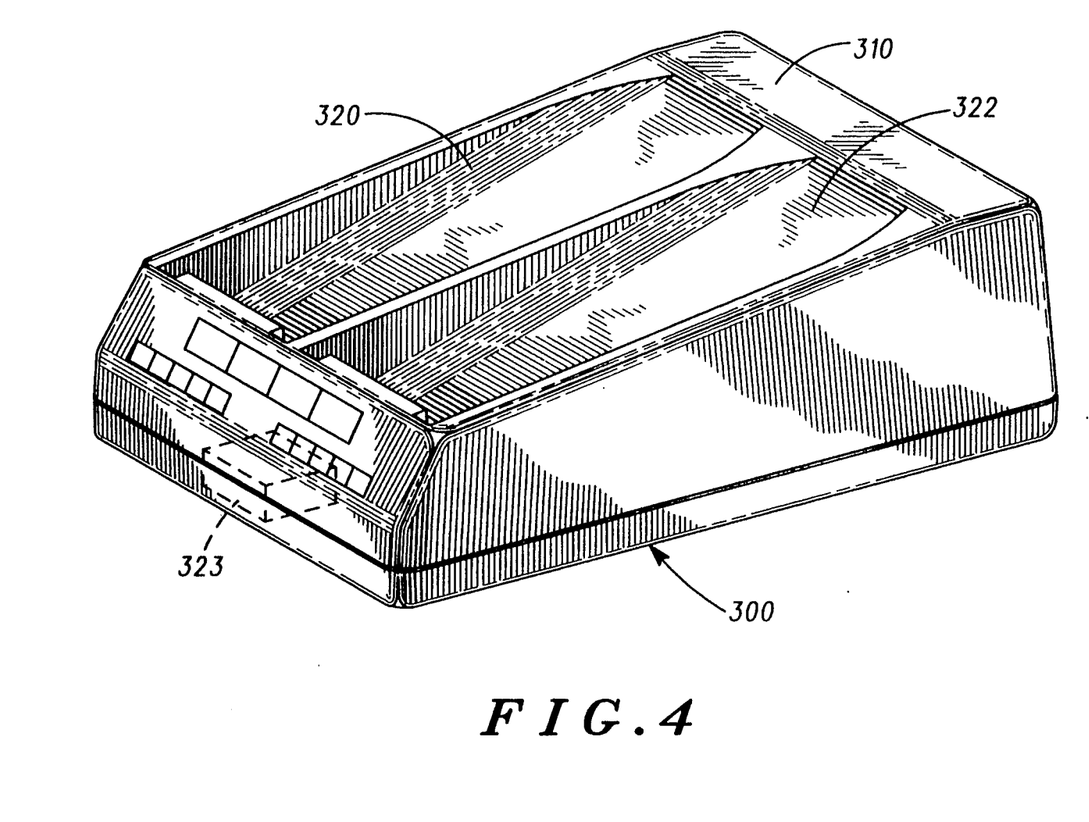
FIG. 4 is an isometric illustration of a battery charger encompassing the battery charging system of the present invention.

Turning now to the isometric illustration of FIG. 4, there is illustrated battery charging apparatus, referred to generally by reference numeral 300 employing the system of the present invention. The battery fast charger 300 includes housing 310 having battery charging pockets 320 and 322 formed on a top surface thereof. The battery fast charging system shown in block form in FIG. 1 may be housed within housing 310, and is represented in FIG. 3 by block 323. Batteries positioned in pockets 320 or 322 may be suitably connected to a charging current through battery charging system 323. When battery charging system 323 detects that the charging current supplied thereto is below a minimum level, termination of fast charging of either or both of the batteries positioned in pocket 320 and/or 322 is initiated. It is to be noted that the values of resistors 82 and 182 (shown in FIGS. 2 and 3, respectively) may be of differing values to cause termination of fast charging of batteries positioned in pockets 20 and 22, respectively, when the fast charging current falls below different minimum levels.

Figure 5A:
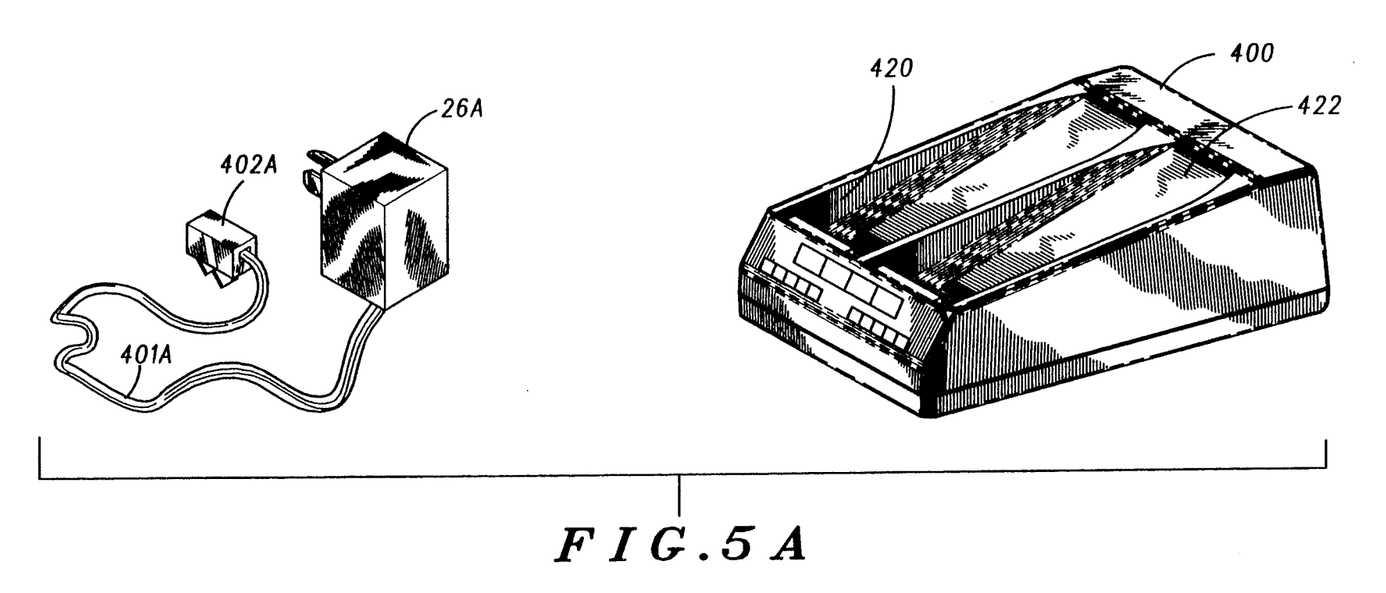
FIG. 5A is an isometric illustration of the battery charger of FIG. 4 positioned to permit connection to a current source according to the teachings of the present invention.

FIG. 5A is an isometric illustration of a battery charging apparatus of the present invention, similar to that of FIG. 3, but further illustrating transformer 26A which may be connected to battery charging apparatus 400.

Figure 5B:
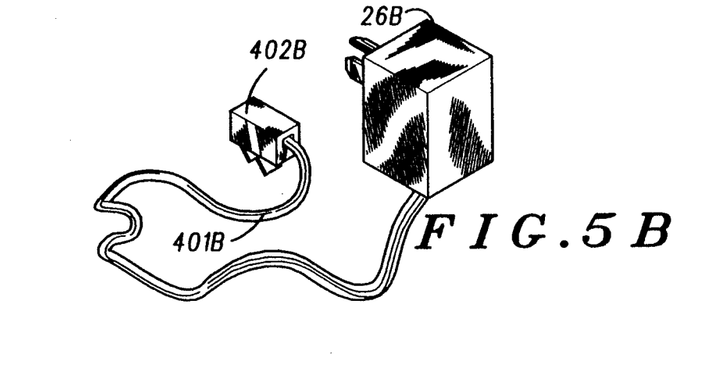
FIGS. 5B and 5C are 150 metric illustrations of alternate-sized apparatus which may be utilized according to the teachings of the present invention.
Figure 5C:
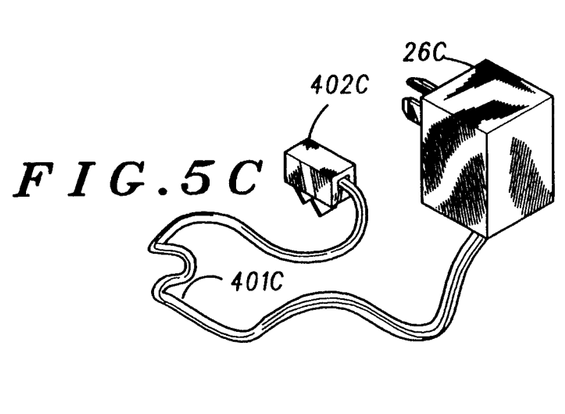

FIGS. 5B and 5C illustrate transformers 26B and 26C, respectively, which may alternately be connected to battery charging apparatus 400 of FIG. 5A. Rectifying circuits, or portions thereof, such as rectifying circuit 28 of FIG. 1 may additionally be housed within the housing of the transformers 26A-C, if desired. Transformers 26A-C are electrically connected to charging apparatus 400 through cables 401A-C, respectively, and connectors 402A-C. Charging apparatus 400 contains a mated connecting portion to permit connection of the connectors 402A-C thereto. Transformer 26A provides a low charging current to battery charging apparatus 400, transformer 26B provides a moderate charging current to charging apparatus 400, and transformer 26C provides a high charging current to charging apparatus 400. Because the charging current supplied on line 29 is supplied to both pockets 420 and 422, a high charging current is required in order to permit fast charging of two batteries simultaneously. By appropriate selection of transformers 26A-26C, the charging current supplied on line 29 is high enough to permit transistor 80 (or 180) to be turned on to thereby permit the current regulation status signal to be generated to permit the fast charging current to be supplied to the respective battery charging pockets 20 and/or 22.

Figure 6:
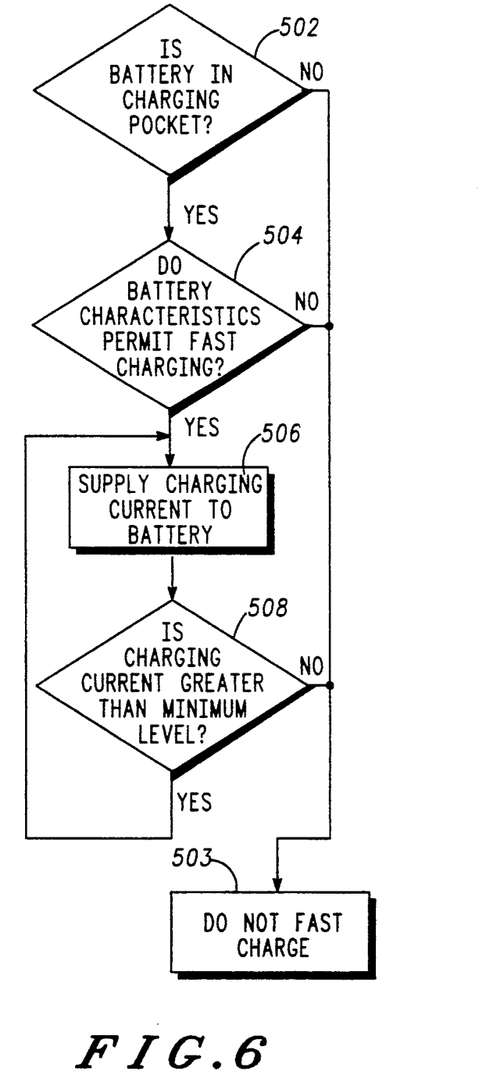
FIG. 6 is a flow diagram illustrating the method steps of the method of the present invention.

Turning now to the flow diagram of FIG. 6, the steps of the method of the preferred embodiment of the present invention are shown. First, as indicated by decision block 502, a determination is made as to whether a battery is positioned (in a battery fast charger charging pocket, for example) to permit fast charging thereof. If the battery is not suitably positioned, the no branch is taken to block 503, and fast charging does not occur. If a battery is suitably positioned to permit fast charging, the yes branch is taken to decision block 504 whereat a determination is made as to whether the battery, although suitably positioned, is of battery characteristics to permit fast charging thereof. For instance, if a battery temperature is too low, fast charging is not permitted. If the battery is not of battery characteristics to permit fast charging, the no branch is taken to block 503. Otherwise, the yes branch is taken to block 506, and the fast charging current is supplied to the battery. Decision block 508 determines if the fast charging current supplied to the battery is above a minimum level to permit continued fast charging thereof. If so, the yes branch is taken to block 506, and fast charging of the battery continues. Otherwise, the no branch is taken to block 503, and fast charging is terminated.

While the present invention has been described in connection with the preferred embodiments of the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A battery charging system for a battery charger having at least one battery charging pocket for fast charging at least one battery with a fast charging current when positioned at the at least one battery charging pocket, said system including:

means electrically connected to the at least one battery charging pocket for supplying said fast charging current to the at least one battery when positioned at the at least one battery charging pocket and the fast charging current is of a level greater than a preset level;

means, coupled to receive signals indicative of levels of the fast charging current supplied by said means for supplying the fast charging current to the at least one battery, for generating a current regulation status signal indicative of values of the fast charging current supplied to the at least one battery by the means for supplying;

means, including timer circuitry, coupled to receive the current regulation status signal generated by said means for generating, and operative responsive to levels of the current regulation status signal, for determining when the fast charging current supplied to the at least one battery by said means for supplying is less than a preset level for at least a predetermined portion of a time period; and means, coupled to the means for supplying and operative responsive to times when said means for determining determines the fast charging current supplied to be less than the preset level for at least the predetermined portion of the time period for discontinuing supply of the fast charging current to the at least one battery.

2. The battery charging system of claim 1 wherein said means for supplying further comprises means for regulating the fast charging current for supplying a regulated charging current to said at least one battery.

3. The battery charging system of claim 1 wherein said means for determining comprises a processing means, coupled to receive the current regulation status signal generated by said means for generating, for determining when the fast charging current supplied to the at least one battery by said means for supplying is less than a preset level for at least the predetermined portion of the time period.

4. The battery charging system of claim 3 wherein values of said current regulation status signal received by the processing means whereat are measured for at least the time period to determine when the fast charging current is less than the preset level for at least the predetermined portion of the time period.

5. The battery charging system of claim 4 wherein said current regulation status signal is generated when the fast charging current supplied to the at least one battery is at least as great as the preset level.

6. The battery charging system of claim 5 wherein said means for discontinuing discontinues the supply of the fast charging current to the at least one battery when the current regulation status signal is generated for less than the predetermined portion of the time period.

7. The battery charging system of claim 6 wherein said processing means generates a charge enable signal responsive to times when the current regulation status signal is supplied thereto for at least the predetermined portion of the time period.

8. The battery charging system of claim 7 wherein said means for discontinuing discontinues the supply of the fast charging current when said processing means fails to generate said charge enable signal.

9. The battery charging system of claim 1 wherein said means for supplying supplies the fast charging current to a first battery positioned in a first charging pocket and a second battery positioned in a second charging pocket.

10. The battery charging system of claim 9 wherein said means for determining determines when the charging current supplied to the first battery in the first charging pocket or the second battery in the second charging pocket is beyond the allowable limits.

11. The battery charging system of claim 10 wherein said means for discontinuing discontinues the supply of charging current to the second battery when the charging current supplied to the second battery is less than the preset level for at least the predetermined portion of the time period, and discontinues the supply of charging current to the first battery when the charging current supplied to the first battery is less than the preset level for at least the predetermined portion of the time period.

12. The battery charging system of claim 11 further comprising means for regulating the magnitudes of the fast charging current supplied to the first battery positioned in the first charging pocket and the second battery positioned in the second charging pocket.

13. The battery charging system of claim 12 wherein said means for regulating regulates the magnitudes of the fast charging currents supplied to the first and second battery charging pockets, respectfully, responsive to determinations made by said means for determining.

14. A method for fast charging at least one battery with a fast charging current, said method comprising the steps of:

supplying the fast charging current to the at least one battery;

generating a current regulation status signal indicative of values of the fast charging current supplied to the at least one battery;

determining when the fast charging current supplied to the at least one battery is less than a preset level for at least a predetermined portion of a time period; and disconnecting the battery from the fast charging current after a predetermined time period when the fast charging current supplied to the battery is less than the preset level for the at least predetermined portion of the time period.

15. The method of claim 14 wherein said step of supplying further comprises regulating the fast charging current.

16. The method of claim 14 wherein said current regulation status signal is generated when the fast charging current is at least as great as the preset level.

17. The method of claim 16 wherein said step of determining comprises supplying said current regulation status signal to a processing means whereat said processing means measures values of the current regulation status signal for at least the time period to determine when the fast charging current is less than the preset level for at least the predetermined portion of the time period.

18. The method of claim 17 wherein said step of disconnecting comprises disconnecting the battery from the fast charging current when the current regulation status signal is generated for less than a predetermined portion of the time period.

19. The method of claim 18 wherein said processor means generates a charge enable signal responsive to times when the processor means receives the current regulation status signal for at least the predetermined portion of the time period.

20. The method of claim 19 wherein said step of disconnecting comprises disconnecting the battery from the fast charging current when the processor means fails to generate the charge enable signal.

* * * * *